United States Patent
Giles

(10) Patent No.: US 12,412,328 B2
(45) Date of Patent: Sep. 9, 2025

(54) PRIMAL SOLVER FOR SIMULATION AND DISPLAY OF RIGID BODIES IN A VIRTUAL ENVIRONMENT

(71) Applicant: Roblox Corporation, San Mateo, CA (US)

(72) Inventor: Christopher Giles, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 224 days.

(21) Appl. No.: 18/228,467

(22) Filed: Jul. 31, 2023

(65) Prior Publication Data

US 2025/0045995 A1    Feb. 6, 2025

(51) Int. Cl.
*G06T 13/00*    (2011.01)
*G06T 7/20*    (2017.01)
*G06T 7/70*    (2017.01)

(52) U.S. Cl.
CPC .............. *G06T 13/00* (2013.01); *G06T 7/20* (2013.01); *G06T 7/70* (2017.01)

(58) Field of Classification Search
CPC .......... G06T 13/00; G06T 13/20; G06T 7/70; G06T 7/20
See application file for complete search history.

(56) References Cited

U.S. PATENT DOCUMENTS

| | | | |
|---|---|---|---|
| 2003/0179205 A1* | 9/2003 | Smith | G06F 30/20 345/474 |
| 2006/0262113 A1* | 11/2006 | Leprevost | G06T 13/20 717/100 |
| 2016/0203630 A1* | 7/2016 | Pai | G06T 13/40 345/473 |
| 2018/0165864 A1* | 6/2018 | Jin | G06F 3/0346 |
| 2018/0240262 A1* | 8/2018 | Hagedoorn | G06T 13/80 |

OTHER PUBLICATIONS

Müller Matthias, "Detailed Rigid Body Simulation with Extended Position Based Dynamics", Nov. 2020, Computer Graphics Forum, 39, pp. 101-112. (Year: 2020).*

(Continued)

*Primary Examiner* — Terrell M Robinson
(74) *Attorney, Agent, or Firm* — IP Spring

(57) ABSTRACT

Some implementations relate to methods, systems, and computer-readable media to display a rigid body object within a virtual environment. In some implementations, the method includes obtaining a model representation of the rigid body object, obtaining a state of the rigid body object in the virtual environment, determining a plurality of constraints that act on the rigid body object, determining a plurality of Jacobians and a plurality of Hessians, wherein each Jacobian of the plurality of Jacobians and each Hessian of the plurality of Hessians is associated with a corresponding constraint of the plurality of constraints, applying a two-stage primal solver to a set of equations of motion for the rigid body object based on the plurality of Jacobians and the plurality of Hessians, and displaying the rigid body object in the updated position in the virtual environment.

20 Claims, 5 Drawing Sheets

(56) References Cited

OTHER PUBLICATIONS

Ye, Yongjing, "Neural3Points: Learning to Generate Physically Realistic Full-body Motion for Virtual Reality Users", 2022, Computer Graphics Forum, 41, pp. 183-194. (Year: 2022).*

Lee, Jeongmin, "Modular and Parallelizable Multibody Physics Simulation via Subsystem-Based ADMM," Jul. 4, 2023, IEEE International Conference on Robotics and Automation (ICRA), pp. 10132-10138 (Year: 2023).*

Andrews, et al., "Geometric Stiffness for Real-time Constrained Multibody Dynamics", In Computer Graphics Forum (vol. 36, No. 2), May 2017, pp. 235-246.

Bender, et al., "Interactive simulation of rigid body dynamics in computer graphics", Comput. Graph. Forum 33, 1, Feb. 2014, pp. 246-270.

Bouaziz, et al., "Projective dynamics: Fusing constraint projections for fast simulation", ACM Transactions on Graphics (TOG) 33, 4, Article 154, Jul. 2014, 11 pages.

Tournier, et al., "Stable constrained dynamics", ACM Transactions on Graphics (TOG), 34(4), 1-10., 2015, pp. 1-10.

Macklin, et al., "Non-Smooth Newton Methods for Deformable Multi-Body Dynamics", ACM Transactions on Graphics (TOG) 38, No. 5, 2019, pp. 1-20.

Macklin, et al., "Primal/Dual Descent Methods for Dynamics", Computer Graphics Forum, 39, 2020, pp. 89-100.

\* cited by examiner

PRIMAL SOLVER FOR SIMULATION AND DISPLAY OF RIGID BODIES IN A VIRTUAL ENVIRONMENT

TECHNICAL FIELD

Implementations relate generally to computer graphics, and more particularly, to methods, systems, and computer readable media to simulate motion of rigid body objects within a virtual environment.

BACKGROUND

Some online platforms (e.g., gaming platforms, media exchange platforms, etc.), allow users to connect with each other, interact with each other (e.g., within a game), create games, and share information with each other via the Internet. Users of virtual experience platforms may participate in multiplayer gaming environments or virtual environments (e.g., three-dimensional environments), design custom gaming environments, design characters, design mechanisms, exchange virtual items/objects with other users, communicate with other users using audio or text messaging, and so forth. Users may interact with objects within the virtual environment, and simulation of the objects may be performed within the virtual environment.

Implicit time integration is a technique utilized in computer graphics for its robustness and efficiency. Given a continuous time dynamics model, an implicit time discretization can result in a nonlinear system of equations. Many numerical methods have been proposed to solve these discretized equations of motion, which can be categorized broadly as primal and dual methods. The terms primal and dual are perhaps most appropriate when viewing implicit integration as a variational problem that formulates time stepping as an energy minimization. Dual methods utilize constraints between the degrees of freedom, and solve the set of equations of motion in terms of their Lagrange multipliers, while primal methods utilize the system degrees of freedom, e.g., positions, velocities, and the forces acting on them. Simulation may be performed to determine a current state of an object based on properties of the object, a previous state, and various force(s) acting on the object. Simulation may be performed using a physics engine (physics platform), which is utilized to apply various physical laws to objects within a virtual environment.

Simulation of objects within the virtual environment may utilize a physics engine and/or physics solver to determine a current state of one or more objects, which may then be displayed on one or more user device(s).

Some implementations were conceived in light of the above.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to display a rigid body object in a virtual environment. The computer—implemented method also includes obtaining a model representation of the rigid body object; obtaining a state of the rigid body object, where the state includes a position and a velocity of the rigid body object in the virtual environment; determining a plurality of constraints that act on the rigid body object; determining a plurality of Jacobians and a plurality of Hessians, where each Jacobian of the plurality of Jacobians and each Hessian of the plurality of Hessians is associated with a corresponding constraint of the plurality of constraints; applying a two-stage primal solver to a set of equations of motion for the rigid body object based on the plurality of Jacobians and the plurality of Hessians, where applying the two-stage primal solver may include: applying a first stage of the primal solver to determine an updated position and velocity of the rigid body object; and applying a second stage of the primal solver to determine an updated position of the plurality of constraints. The method also includes displaying the rigid body object in the updated position in the virtual environment. Other embodiments of this aspect include corresponding computer systems, apparatus, and computer programs recorded on one or more computer storage devices, each configured to perform the actions of the methods.

Implementations may include the computer-implemented method where the plurality of constraints are determined based on one or more other bodies in the virtual environment that act on the rigid body object. Applying the two-stage primal solver may include solving a minimization equation determined from the set of equations. The set of equations is represented as a matrix, and where each row of the matrix of the set of equations corresponds to a particular constraint of the plurality of constraints. Applying the first stage to determine the updated position may include calculating an integral of the updated velocity of the rigid body object over a time period. Determining the plurality of Jacobians for the rigid body object may include determining an energy potential for each constraint of the plurality of constraints. Determining the energy potential may include determining a constraint stiffness of each constraint of the plurality of constraints. Determining the constraint stiffness may include determining the constraint stiffness based on a force applied to the constraint during an immediately preceding performance of the method. The constraint stiffness of the additional constraint is based on a force acting on rigid body objects associated with the additional constraint. Implementations of the described techniques may include hardware, a method or process, or computer software on a computer-accessible medium.

One general aspect includes a non-transitory computer-readable medium with instructions stored thereon that responsive to execution by a processing device, cause the processing device to perform operations comprising: obtaining a model representation of a rigid body object; obtaining a state of the rigid body object, where the state includes a position and a velocity of the rigid body object in a virtual environment; determining a plurality of constraints that act on the rigid body object; determining a plurality of Jacobians and a plurality of Hessians, where each Jacobian of the plurality of Jacobians and each Hessian of the plurality of Hessians is associated with a corresponding constraint of the plurality of constraints; applying a two-stage primal solver to a set of equations of motion for the rigid body object based on the plurality of Jacobians and the plurality of Hessians, where applying the two-stage primal solver may include: applying a first stage of the primal solver to determine an updated position and velocity of the rigid body object; and applying a second stage of the primal solver to correct positional error of the plurality of constraints. The medium also includes displaying the rigid body object in the updated position in a virtual environment. Other embodiments of this aspect include corresponding computer systems, apparatus, and computer programs recorded on one or more computer storage devices, each configured to perform the actions of the methods.

Implementations may include the non-transitory computer-readable medium where the plurality of constraints are determined based on one or more other bodies in the virtual environment that act on the rigid body object. Determining the plurality of Jacobians for the rigid body object may include determining an energy potential for each constraint of the plurality of constraints. Determining the energy potential for each constraint may include determining a constraint stiffness of each constraint of the plurality of constraints. Implementations of the described techniques may include hardware, a method or process, or computer software on a computer-accessible medium.

One general aspect includes a system that includes a memory with instructions stored thereon; and a processing device, coupled to the memory, the processing device configured to access the memory and execute the instructions, where the instructions cause the processing device to perform operations including: obtaining a model representation of a rigid body object; obtaining a state of the rigid body object, where the state includes a position and a velocity of the rigid body object in a virtual environment; determining a plurality of constraints that act on the rigid body object; determining a plurality of Jacobians and a plurality of Hessians, where each Jacobian of the plurality of Jacobians and each Hessian of the plurality of Hessians is associated with a corresponding constraint of the plurality of constraints; applying a two-stage primal solver to a set of equations of motion for the rigid body object based on the plurality of Jacobians and the plurality of Hessians, where applying the two-stage primal solver may include: applying a first stage of the primal solver to determine an updated position and velocity of the rigid body object; and applying a second stage of the primal solver to correct positional error of the plurality of constraints that act on the rigid body object. The system also includes displaying the rigid body object in the updated position in a virtual environment. Other embodiments of this aspect include corresponding computer systems, apparatus, and computer programs recorded on one or more computer storage devices, each configured to perform the actions of the methods.

Implementations may include the system where the plurality of constraints are determined based on one or more other bodies in the virtual environment that act on the rigid body object. The set of equations is represented as a matrix, and where each row of the matrix of the set of equations corresponds to a particular constraint of the plurality of constraints. The operations further may include determining a constraint stiffness of each constraint of the plurality of constraints. Determining the constraint stiffness may include determining the constraint stiffness based on a force applied to the constraint during an immediately preceding performance of the operation. The operations further may include comparing the plurality of constraints to prior constraints obtained during an immediately preceding performance of the operations to identify an additional constraint, and where the constraint stiffness of the additional constraint is based on a force acting on rigid body objects associated with the additional constraint. The force acting on rigid body objects associated with the additional constraint is gravity. Implementations of the described techniques may include hardware, a method or process, or computer software on a computer-accessible medium.

DETAILED DESCRIPTION

Figure 1:
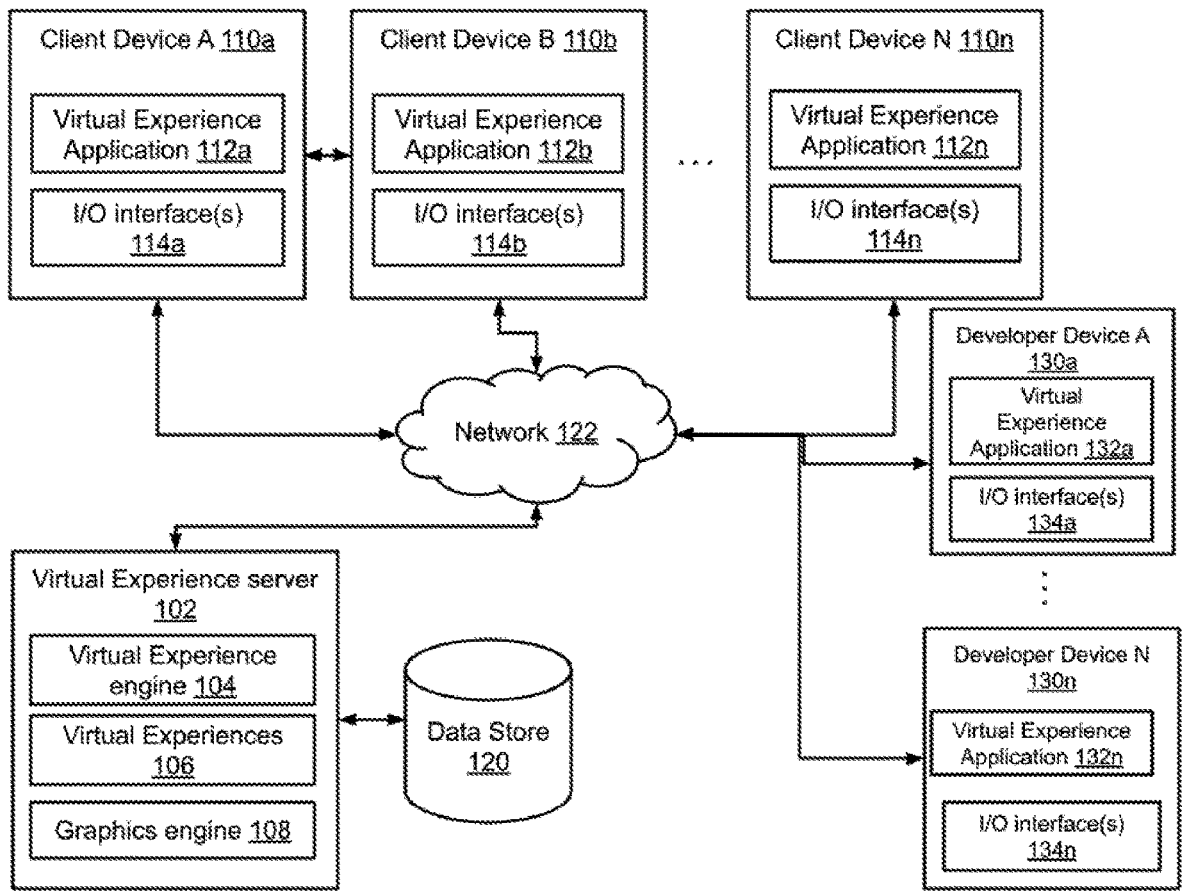
FIG. 1 is a diagram of an example system architecture for simulation of rigid body objects, in accordance with some implementations.

In the following detailed description, reference is made to the accompanying drawings, which form a part hereof In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Virtual experience platforms (also referred to as "user-generated content platforms" or "user-generated content systems") offer a variety of ways for users to interact with one another. For example, users of a virtual experience platform/online gaming platform may work together towards a common goal, share various virtual gaming items, send electronic messages to one another, and so forth. Users of a virtual experience platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

The online gaming/virtual experience platform may also support use of virtual objects that mimic physical objects (rigid body objects) within a virtual environment. For example, the virtual experience platform may enable users to design and introduce various categories of virtual objects, e.g., vehicles, machines, weapons and weapon accessories, toys, structures, etc. These objects may be viewed by one or more users within a virtual environment supported by the virtual experience platform. For example, motion of such objects within the virtual environment may be displayed on user devices.

Display of the rigid body objects on user devices such as screens, augmented reality displays, virtual reality displays, etc., is based on positions and orientations of the rigid body objects that are determined based on simulation (computer graphics) of the state of the rigid body objects based on their initial state(s), constraints and/or forces acting on them, terrain, etc.

The state of a physical system can be represented in terms of the set of equations of motion for the system. The set of equations of motions can be solved in terms of known quantities, e.g., forces acting on the physical system, to determine unknown quantities, e.g., position and velocity of objects in the system.

The set of equations may be solved by a physics engine that may include a physics solver utilized to determine an updated state of objects within the virtual environment. An output of a physics engine and/or physics solver may be utilized to display an updated state of one or more objects, e.g., rigid body objects, avatars, etc., within the virtual environment. Enabling real-time updates of motion of objects within a virtual environment may be enabled by a computationally efficient physics solver that can accurately determine an updated state within time limits imposed for such computation(s). Additionally, the physics solver is implemented to account for various types of possible objects designed by users and still not be susceptible to instabilities, e.g., wherein underlying algorithms within the physics solver do not converge due to a particular type of rigid body object designed and provided by a user. A physics engine and/or physics solver can improve computational performance across devices in the virtual experience platform while also providing a better user experience, e.g., by displays where objects in the virtual environment move smoothly without jitter, etc.

A virtual experience platform may also allow users (developers) of the platform to create new objects, terrains, and/or mechanisms. For example, users of the virtual experience platform may be enabled to create, design, and/or customize new objects such as vehicles, tools, toys, and make them available to other users.

The virtual experience platform may provide tools to support simulation of objects and mechanisms within a virtual environment. In some implementations, a physics engine and/or physics solver may be utilized for the simulation of objects.

One or more objects and/or parameters within a virtual environment may be such that the complexity of simulating the objects and environment may be computationally expensive to enable the simulation to meet time requirements for real-time simulation and rendering of the object. For example, an updated state of objects may have to be determined within a time period that meets requirements for a particular frame refresh rate of a display device where the updated state of objects is displayed to a user. Failure to meet the time requirement can lead to jittery updates, leading to a poor visual experience for the user.

An objective of a virtual experience platform owner or administrator is superior user experience for its users. A technical problem for virtual experience platform operators is accurate, timely, and computationally efficient determination of object states within a virtual environment.

Some virtual experience environments may restrict the types of objects that are permitted to be utilized on the virtual experience platform, and/or may utilize physics engines and physics solvers that are tailored to the particular types of objects. It may be beneficial for virtual experience platforms to permit a broader variety of objects and users may be encouraged to design and introduce complex mechanisms that may include multiple rigid body objects that are associated with multiple constraints. Physics solvers that provide satisfactory simulation results for some objects can fail to do so, for other complex objects and/or mechanisms. In some cases, conventional physics solvers may encounter instabilities, causing the objects to explode, disappear, or exhibit other behaviors that are unnatural or impossible under the rules defined for the virtual environment, e.g., gravity or other factors within the virtual environment etc.

The present disclosure addresses the above-described drawbacks by utilization of a physics solver that takes rigid body object characteristics and constraint characteristics into account during determination of updated object states. In addition, matrix techniques are applied to provide a physics solver that is robust to a variety of objects and mechanisms and is computationally efficient. In particular, the physics solver as described herein utilizes matrices, e.g., Jacobian and Hessian matrices, to represent a set of equations associated with motion of the objects.

Technical Problems

Rigid body dynamics are governed by the equations of motion that are based on the properties of the rigid body object, constraint functions that model forces acting on the rigid body object, such as collisions and joints. These constraint functions can be further divided into two categories: equality constraints and inequality constraints.

Most real time simulation engines and physics engines solve this problem in the dual form. The constraint forces (the dual variables) are first determined, which are then utilized to update the velocity (the primal variables) and the position of the rigid body object. Several problems arise from this formulation.

For one, due to the nature of the linear system to be solved, the dual formulation has difficulty handling the interaction of rigid body objects that have a high mass ratio (one object being much heavier than the other).

Additionally, most real time solvers will neglect the second order (geometric stiffness) terms, which is important for ensuring convergence. While the second order terms can be included in the dual formulation, it increases the complexity of the set of equations to be solved and may not be computationally feasible for real time implementations. There are approximations for the second order terms that can be utilized, but this can introduce artifacts (e.g., numerical errors).

An additional challenge to utilization of dual solvers is that in order to handle both equality and inequality constraints in the dual form, a class of mathematical problems called MLCP (Mixed Linear Complementarity Problem) is to be solved. The available techniques to solve MLCPs effectively are usually not suitable for real time use. Projected Gauss-Seidel (PGS) is the most used technique for real time simulations, but the convergence of the PGS solver can slow down and may need a prohibitively large number of iterations for large systems of rigid bodies.

Additionally, the size of the linear system to be solved in the dual formulation is dependent on the number of constraints. This can make some common cases, such as a pile of contacting objects, very expensive—because there exist many contact points between each pair of colliding objects, where each contact point requires several constraints.

The present disclosure provides a technical solution and describes a primal formulation to solve the set of equations. The primal solver solves directly for the velocities of the rigid body object(s) instead of first calculating the forces acting on the rigid body object(s). The primal formulation is cast as a minimization problem, which can then be solved, e.g., by applying Newton's method. The primal formulation of the set of equations is based on the Jacobian (gradient) and the Hessian (second order derivatives) of an objective function associated with the constraints associated with the rigid body object(s). In some implementations, the full Jacobian and Hessian terms are included prior to the application of Newton's method to obtain a solution to the set of equations.

The discrete equations of motion being solved can be represented as:

$$M(u^+ - \tilde{u}) - \Delta t f(q^+, u^+) = 0,$$

where $$\tilde{u} \equiv u^- + \Delta t M^{-1}(f_{ext} + f_{gyro})$$

is an unconstrained velocity that includes the external and gyroscopic forces integrated explicitly.

An objective function is defined, e.g., $$g(u) = \frac{1}{2}(u - \tilde{u})^T M(u - \tilde{u}) + \sum_i U_i(u),$$

where $U_i$ represents arbitrary energy potentials that gives rise to the forces f on the system. The solution to the equations of motion is represented by the optimization problem:

$$u^+ = \operatorname*{argmin}_u g(u)$$

The optimization problem can be further simplified to a linear set (system) of equations that includes the following terms:

$$\frac{\partial g}{\partial u} = M(u - \tilde{u}) + \sum_i \frac{\partial U_i}{\partial u}$$

$$\frac{\partial^2 g}{\partial u^2} = M + \sum_i \frac{\partial^2 U_i}{\partial u^2}$$

In some implementations, multiple iterations of Newton's method are performed until a predetermined error threshold is reached. During each iteration of Newton's method, a linear set (system) of equations of a type, Ax=−b is solved, where A is the Hessian of the objective function, and b is the Jacobian (gradient) of the objective function. The linear system is solved by utilizing a preconditioned conjugate residual algorithm, where the diagonal of A is utilized as the preconditioner. During each iteration of the Newton solver (linear solver), a residual error is determined, and the iterations can be terminated early when the residual error meets a threshold error.

The primal formulation of the set of equations of motion is better suited to handle high mass ratios of rigid body objects more robustly than the dual formulation due to the nature of the linear system being solved. Additionally, the primal formulation enables a unified treatment of constraints, contacts, and other forces by posing the problem as a minimization problem. The primal formulation approach offers a wider range of options for obtaining a solution to the system compared to a more limited set of solution options for the dual formulation, which is typically cast as an MLCP (Mixed Linear Complementarity Problem).

To further improve the primal formulation, Newton's method is applied to solve the set (system) of equations. Specifically, an exact left-hand side is utilized to solve the system, enabling utilization of fewer iterations (steps) of Newton's method when compared to a Jacobi-style solver. By doing so, greater computational efficiencies can be achieved with greater accuracy of results.

A dynamically determined constraint stiffness value is utilized for each step and each constraint of the constraints acting on the rigid body object. In some implementations, the constraint stiffness is determined based on a lagged constraint force acting on the rigid body object. Additionally, for new constraints, the constraint stiffness can be determined based on a force of gravity acting on the rigid body object.

In some implementations, memory allocation is performed based on a structure of the matrices associated with the system(s) of equations that govern simulated rigid body objects, which can further improve runtime performance.

FIG. 1 is a diagram of an example system architecture for simulation of rigid body objects, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The system architecture 100 (also referred to as "system" herein) includes virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Virtual experience server 102 can include, among other things, a virtual experience engine 104, one or more virtual experiences 106, and graphics engine 108. In some implementations, the graphics engine 108 may be a system, application, or module that permits the virtual experience server 102 to provide graphics and animation capability. In some implementations, the graphics engine 108 may perform one or more of the operations described below in connection with the method shown in FIG. 4. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the virtual experience server 102 can include a server having one or more computing devices (e.g., a cloud computing system, a rackmount server, a server computer, cluster of physical servers, etc.). In some implementations, the virtual experience server 102 may be an independent system, may include multiple servers, or be part of another system or server.

In some implementations, the virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the virtual experience server 102 and to provide a user with access to virtual experience server 102. The virtual experience server 102 may also include a website (e.g., a web page) or application back-end software that may be used to provide a user with access to content provided by virtual experience server 102. For example, users may access virtual experience server 102 using the virtual experience application 112 on client devices 110.

In some implementations, gameplay session data are generated via virtual experience server 102, virtual experience application 112, and/or virtual experience application 132, and are stored in data store 120. With permission from game players, gameplay session data may include associated metadata, e.g., game identifier(s); device data associated with the players; demographic information of the player(s); gameplay session identifier(s); chat transcripts; session start time, session end time, and session duration for each player; relative locations of participant avatar(s) within a virtual game environment; in-game purchase(s) by one or more player(s); accessories utilized by game players; etc.

In some implementations, virtual experience server 102 may be a type of social network providing connections between users or a type of user-generated content system that allows users (e.g., end-users or consumers) to communicate with other users on the virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between players.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual game environment, accessories utilized by game participants, etc. In some implementations, the chat transcripts may include multilingual content, and messages in different languages from different gameplay sessions of a game may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, virtual experience server 102 may be a virtual experience server. For example, the virtual experience server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a virtual experience (e.g., 106) or the presentation of the interaction on a display or other output device (e.g., 114) of a client device 110.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 106 may be collectively referred to as a "world" or "gaming world" or "virtual world" or "universe" herein. An example of a world may be a 3D world of a virtual experience 106. For example, a user may build a virtual environment that is linked to another virtual environment created by another user. A character of the virtual game may cross the virtual border to enter the adjacent virtual environment.

Three-dimensional (3D) environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the virtual experience server 102 can host one or more virtual experiences 106 and can permit users to interact with the virtual experiences 106 using a virtual experience application 112 of client devices 110. Users of the virtual experience server 102 may play, create, interact with, or build virtual experiences 106, communicate with other users, and/or create and build objects (e.g., also referred to as "item(s)" or "virtual experience objects" or "virtual game item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the virtual experience server 102. In some implementations, virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with virtual experience server 102 or virtual experience applications. In some implementations, game objects (e.g., also referred to as "item(s)" or "objects" or "virtual objects" or "virtual game item(s)" herein) may refer to objects that are used, created, shared or otherwise depicted in virtual experience applications 106 of the virtual experience server 102 or virtual experience applications 112 of the client devices 110. For example, game objects may include a part, model, character, accessories, tools, weapons, clothing, buildings, vehicles, currency, flora, fauna, components of the aforementioned (e.g., windows of a building), and so forth.

It may be noted that the virtual experience server 102 hosting virtual experiences 106, is provided for purposes of illustration. In some implementations, virtual experience server 102 may host one or more media items that can include communication messages from one user to one or more other users. With user permission and express user consent, the virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private game), or made widely available to users with access to the virtual experience server 102 (e.g., a public game). In some implementations, where virtual experience server 102 associates one or more virtual experiences 106 with a specific user or group of users, virtual experience server 102 may associate the specific user(s) with a virtual experience 106 using user account information (e.g., a user account identifier such as username and password).

In some implementations, virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of virtual experience server 102, or a combination of both.

In some implementations, both the virtual experience server 102 and client devices 110 may execute a virtual experience engine (104 and 112, respectively). The virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the virtual experience server 102 and the virtual experience engine functions that are performed on the client devices 110. For example, the virtual experience engine 104 of the virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the virtual experience server 102 and client device 110 may be changed (e.g., dynamically) based on gameplay conditions. For example, if the number of users participating in gameplay of a particular virtual experience 106 exceeds a threshold number, the virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the virtual experience server 102. Subsequent to receiving control instructions from the client devices 110, the virtual experience server 102 may send gameplay instructions (e.g., position and velocity information of the characters participating in the group gameplay or commands, such as rendering commands, collision commands, etc.) to the client devices 110 based on control instructions. For instance, the virtual experience server 102 may perform one or more logical operations (e.g., using virtual experience engine 104) on the control instructions to generate gameplay instruction(s) for the client devices 110. In other instances, virtual experience server 102 may pass one or more or the control instructions from one client device 110 to other client devices (e.g., from client device 110a to client device 110b) participating in the virtual experience 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the virtual experience server 102. In other implementations, the control instructions may be sent from a client device 110 to another client device (e.g., from client device 110b to client device 110n), where the other client device generates gameplay instructions using the local virtual experience engine 104. The control instructions may include instructions to play a voice communication message or other sounds from another user on an audio device (e.g., speakers, headphones, etc.).

In some implementations, gameplay instructions may refer to instructions that enable a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the virtual experience platform may provide users access to simplified 3D virtual object models that are represented by a mesh of a low polygon count, e.g., between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the virtual experience server 102 may store characters created by users in the data store 120. In some implementations, the virtual experience server 102 maintains a character catalog and virtual experience catalog that may be presented to users. In some implementations, the virtual experience catalog includes images of virtual experiences stored on the virtual experience server 102. In addition, a user may select a character (e.g., a character created by the user or other user) from the character catalog to participate in the chosen game. The character catalog includes images of characters stored on the virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users.

For example, a user may choose a default character from a character catalog that has predefined character settings, and the user may further customize the default character by changing some of the character settings (e.g., adding a shirt with a customized logo). The character settings may be associated with a particular character by the virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 and allows users to interact with virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application may be an application for users to build, create, edit, upload content to the virtual experience server 102 as well as interact with virtual experience server 102 (e.g., play games hosted by virtual experience server 102). As such, the virtual experience application may be provided to the client device(s) 110 by the virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 130 and allows users to interact with virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an virtual experience application for users to build, create, edit, upload content to the virtual experience server 102 as well as interact with virtual experience server 102 (e.g., provide and/or play virtual experiences 106 hosted by virtual experience server 102). As such, the virtual experience application may be provided to the client device(s) 130 by the virtual experience server 102. In another example, the virtual experience application 132 may be an application that is downloaded from a server. Virtual experience application 132 may be configured to interact with virtual experience server 102 and obtain access to user credentials, user currency, etc. for one or more virtual experiences 106 developed, hosted, or provided by a virtual experience developer.

In some implementations, a user may login to virtual experience server 102 via the virtual experience application. The user may access a user account by providing user account information (e.g., username and password) where the user account is associated with one or more characters available to participate in one or more virtual experiences 106 of virtual experience server 102. In some implementations, with appropriate credentials, a virtual experience developer may obtain access to virtual experience objects, such as in-platform currency (e.g., virtual currency), avatars, special powers, accessories, that are owned by or associated with other users.

In general, functions described in one implementation as being performed by the virtual experience server 102 can also be performed by the client device(s) 110, or a server, in other implementations if appropriate. In addition, the functionality attributed to a particular component can be performed by different or multiple components operating together. The virtual experience server 102 can also be accessed as a service provided to other systems or devices through suitable application programming interfaces (APIs), and thus is not limited to use in websites.

Figure 2:
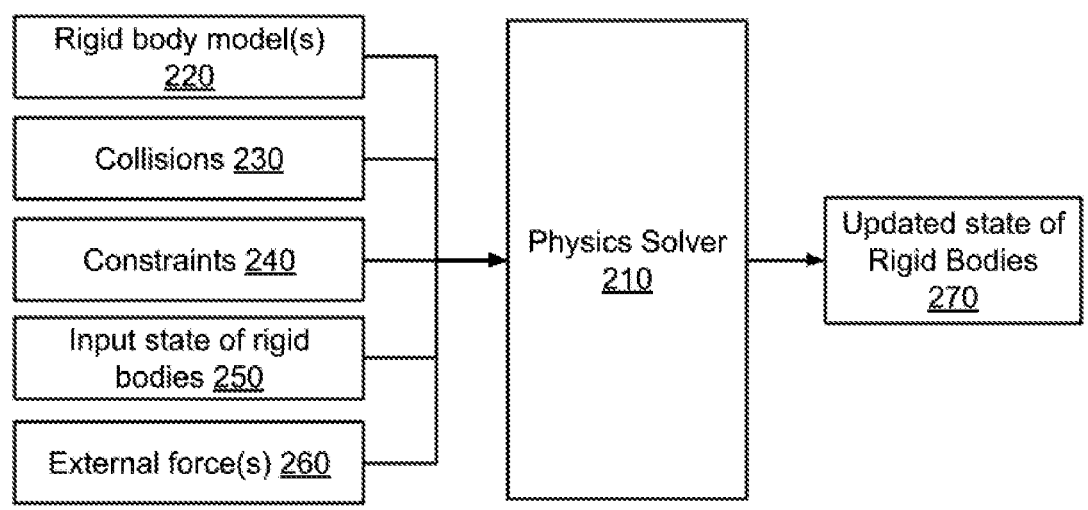
FIG. 2 depicts an example physics solver utilized to simulate motion of rigid body objects, in accordance with some implementations.

FIG. 2 depicts an example physics solver utilized to simulate motion of rigid body objects, in accordance with some implementations. The example physics solver may be utilized in an online virtual experience platform to simulate motion of constrained rigid body objects (rigid bodies) and mechanisms under the influence of forces in a virtual environment.

A rigid body object is an idealized approximation to a solid body in which deformation is zero or negligible. The distance between points on a rigid body remains constant in time regardless of external forces or moments exerted on it.

The physics solver 210 may be implemented within a physics engine that is part of a virtual experience platform to track and render motion of rigid bodies that may be part of a game and/or other virtual experience in a virtual environment, and to determine the effects of forces such as gravity, collisions between bodies, etc., on a rigid body as the game proceeds from one frame to the next.

In various implementations, the physics solver 210 may be implemented as part of virtual experience server 102, and/or may be included within a virtual experience engine 104 and/or graphics engine 108. In some implementations, a physics solver is included within a physics engine.

In some implementations, the physics solver may be implemented within one or more client devices 110 or one or more developer devices 130. In some implementations, functionality of a physics solver may be implemented across one or more devices, e.g., between virtual experience server 102, client device 110, or developer device 130.

As depicted in FIG. 2, the physics solver takes as inputs rigid body object model(s) representation 220, collision data 230 associated with the rigid body objects, constraints 240 imposed on the rigid body objects, an input state 250 of the rigid body objects, and external forces 240 acting on the rigid body objects. In some implementations, one or more of these inputs may not be utilized (e.g., collision data 230) under certain situations (e.g., when objects do not undergo collisions). In some implementations, additional inputs can be provided to physics solver 210. The physics solver generates as output an updated state 270 of the rigid body objects, based on the combined effect on the inputs described earlier, which can be utilized to update the display of the rigid body object within the virtual experience In some implementations, the rigid body object model representation 220 is a representative model of a corresponding rigid body object and may include information about the rigid body, e.g., shape, dimension, material properties, etc. In some implementations, the rigid body model representation may include additional information that pertains to body physics, e.g., moment of inertia, center of gravity, etc.

In some implementations, collision data (e.g., collisions 230) is obtained by collision detection, which may be implemented within a physics engine, e.g., as a module. Collisions between rigid body objects within a virtual environment are detected based on intersections between geometries associated with the rigid body objects. Collision data such as collision points, normals, penetration depths, etc. are generated by a collision detector.

Constraints 240 are restrictions on the motion of rigid body objects that may be provided by the user as part of the model representation of a rigid body object. In some scenarios, constraints may be related to one or more conditions of an environment that limit degrees of freedom of motion of the rigid body object. For example, rails that guide motion of a train may be a constraint. Examples of constraints additionally include joints (such as ball joints, hinge joints), etc., and non-penetration constraints.

An input state 250 of the rigid body object to the solver may either be an initial state, e.g., at the start/commencement of a simulation, or a previous rigid body object state from a previously determined state. For example, an input state may be an initial state of a vehicle in a virtual environment, just before the vehicle starts moving.

Inputs to the physics solver also include external force(s) 260 that act on the rigid body object within the virtual environment, e.g., a gravitational force that is acting on a falling rigid body object. The external force(s) may be a default setting within the environment, user defined settings, or a combination. For example, a specified horsepower of a vehicle and an input setting provided by a user (e.g., using a gamestick or remote) may be utilized to derive a force acting on a vehicle based on generated engine power. Similarly, a user may specify a gravity-free setting for a virtual environment, which results in simulation of a gravity-free virtual environment, e.g., gravitational forces would not be applied on the rigid body object.

Based on provided inputs, the physics solver determines an updated state of the rigid body object(s) by solving for the motion of rigid bodies under the influence of various provided inputs.

The updated state of the rigid body object(s) 270 is determined by the physics solver by applying the laws of physics as defined within the virtual environment, such as conservation of energy and momentum, to the rigid body object(s). Exact determination, however, can be prohibitively expensive, real-time simulation of rigid body object motion is performed by the user of approximate techniques. This enables suitable performance, e.g., by completion of simulation within a provided time window, while providing physically realistic results. In a virtual experience environment, a technical objective is to maintain adherence to the basic laws of motion within a reasonable tolerance.

One approximation technique utilized is to discretize the motion of the rigid body object using time-stepping. The equations of motion of constrained and unconstrained rigid body objects can be difficult to integrate directly and accurately. Discretization subdivides the motion into small time increments, wherein the equations are simplified and linearized, thereby enabling an approximate solution. During each time step, the motion of the relevant parts of rigid bodies that are associated with a constraint is linearly approximated. The physics solver is utilized to solve the linearized equations of motion for a time step to obtain an updated state of a rigid body object.

In some implementations, an iterative method may be utilized to solve the equations of motion, wherein with each iteration, an approximate solution for an updated state of the rigid body object is obtained, that is brought closer to a true solution. A final accuracy of a solution may be based on a number of iterations performed by the physics solver.

In some implementations, a primal solver, e.g., a Newton solver, can be utilized to provide an efficient and robust method to solve the equation of motion by utilizing implicit time integration. The primal solver utilizes a primal formulation of the equations of motion, whereby an optimization problem is solved in terms of system degrees of freedom such as positions, velocities, forces, etc.

In some implementations, a gradient descent solver or a quasi-Newton method such as limited-memory Broyden-Fletcher-Goldfarb-Shanno algorithm (L-BFGS) algorithm may be utilized.

In some implementations, Newton's method is utilized to solve the minimization problem that is formulated based on energy potentials that are utilized to model constraints, contact, and friction.

In some implementations, a two-stage solver is utilized. Splitting the solver into two stages, e.g., a position stage and a velocity stage enables superior handling of positional errors that can occur due to network synchronization, game scripts, imperfect solution of the system of equations in previous timesteps, etc.

Figure 3A:
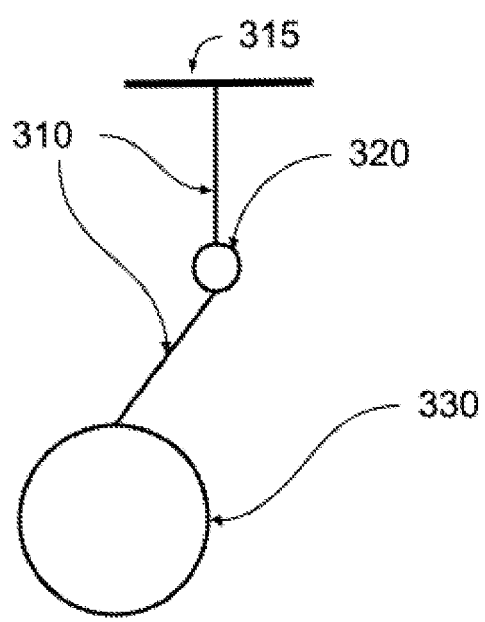
FIG. 3A and FIG. 3B depict example rigid body objects, in accordance with some implementations.
Figure 3B:
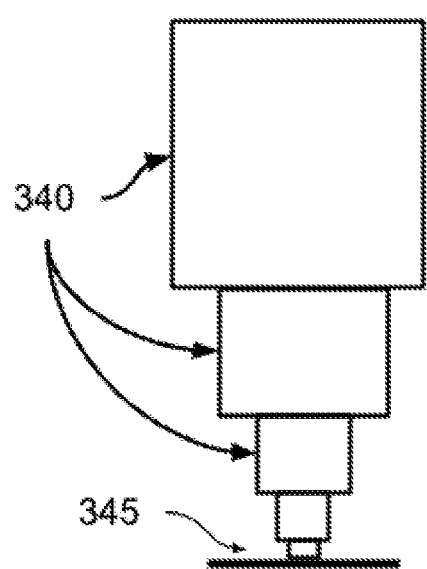

FIG. 3A and FIG. 3B depict examples of rigid body objects, in accordance with some implementations.

In a first illustrative example, FIG. 3A depicts a system of two spheres connected by strings 310 to a surface, e.g., a ceiling. A small sphere 320 is attached to ceiling 315, and to a larger sphere 330. Moving the larger sphere to one side would initiate a pendulum-like motion that involves both spheres moving under the influence of gravity until they can come to a state of rest.

In a second illustrative example, FIG. 3B depicts a set of stacked blocks 340 of different sizes, stacked on top of one another. In this scenario, the state of the set of blocks is governed by forces of gravity that act on the stack of blocks, the friction force from the contact between the blocks, and the friction force between the lowermost block and the surface, e.g., floor 345.

Simulation of the state of the rigid bodies can pose challenges to commonly utilized physics solvers. For example, depending on the ratio of the masses of the two sphere pendulum, dual solvers may encounter stability problems, in scenarios that include objects that are vastly different in mass that are undergoing motion. For example, in the case of a double pendulum, where a pendulum that is placed higher has a relatively small mass, and the lower pendulum has a relatively large mass, the distance constraints that hold the two pendulums together would demonstrate poor convergence in a dual solver (without geometric stiffness). Similarly, poor convergence in a dual solver may be observed in a scenario where a small box rests on the ground, with a much larger box directly on top of the smaller box.

Similarly, in scenarios with stacked objects with different masses, e.g., a heavy object laying on top of a light object, dual solvers can produce solutions to the equations of motion that mimic jitter, whereby the stacked objects fall over. In some scenarios, stacked objects, even when not differing in mass, can pose challenges to some types of physics solvers. Jitter may eventually cause stacked objects (with high mass ratios) to fall over in simulation, whereas in real life, they would have stayed stacked. In some cases, the jitter may be minor enough that it manifests mainly as a visual artifact, but often the error it causes may accumulate over time causing noticeable differences in the outcome of an unfolding scene.

The primal solver as described herein provides superior performance under such conditions, and the stability of the primal solver is invariant to the mass ratio(s) of the rigid body objects being simulated.

Figure 4:
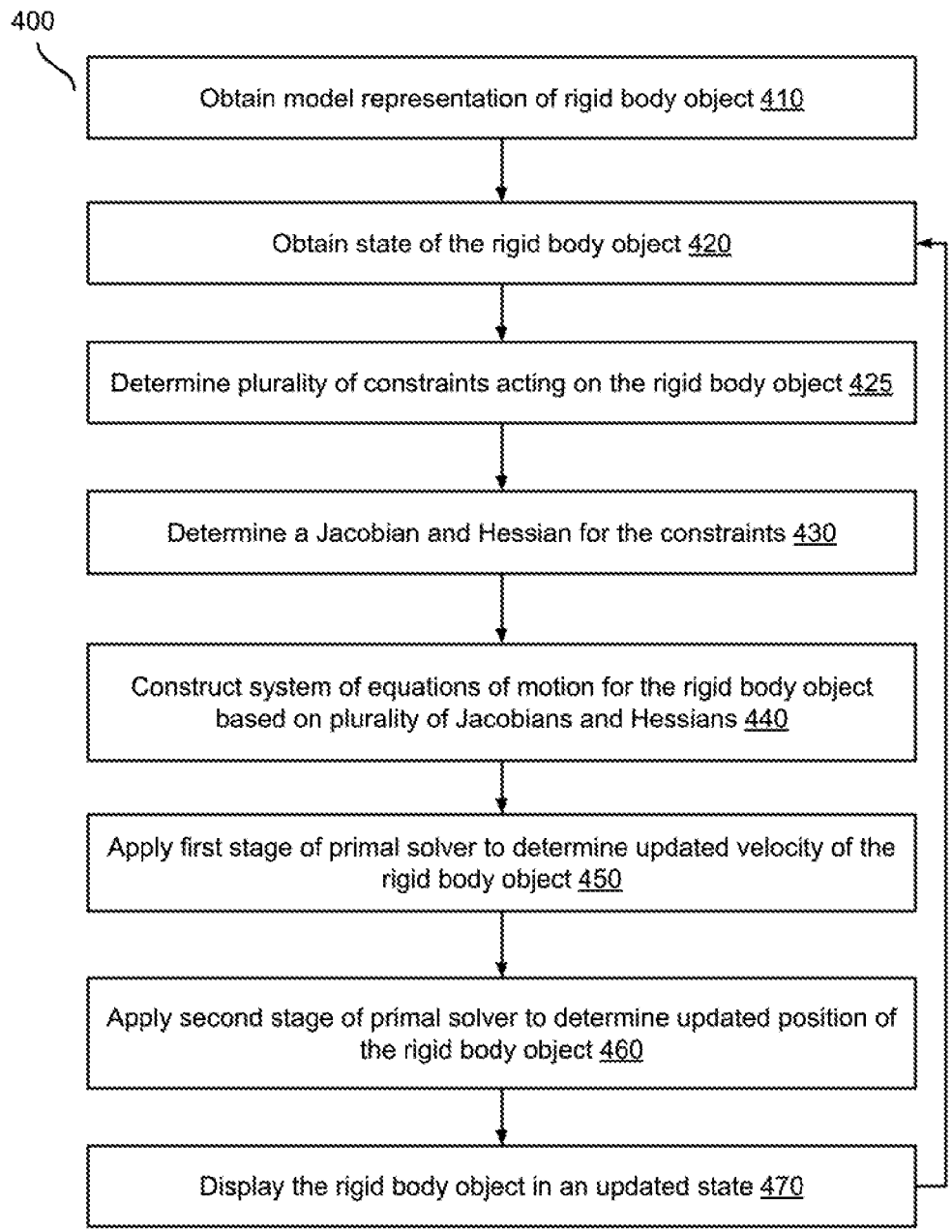
FIG. 4 is a flowchart that illustrates an example method to simulate and/or display a rigid body object within a virtual environment, in accordance with some implementations.

FIG. 4 is a flowchart illustrating an example method 400 to simulate and/or display a rigid body object within a virtual environment, in accordance with some implementations. In some implementations, method 400 can be implemented, for example, on virtual experience server 102 described with reference to FIG. 1. In some implementations, some or all of the method 400 can be implemented on one or more client devices 110 as shown in FIG. 1, on one or more developer devices 130, or on one or more server device(s) 102, and/or on a combination of developer device(s), server device(s) and client device(s). In described examples, the implementing system includes one or more digital processors or processing circuitry ("processors"), and one or more storage devices (e.g., a data store 120 or other storage).

In some implementations, special-purpose processors, e.g., physics processors, vector processors, graphics processors, accelerators, field-programmable gate arrays (FPGAs), application-specific integrated circuits (ASICs), etc. may be utilized to implement one or more blocks of method 400.

In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device. Method 400 may begin at block 410.

At block 410, a model representation of the rigid body object is obtained. In some implementations, the model representation may include a model, e.g. two-dimensional (2D) or three-dimensional (3D) model of a rigid body object that describes the rigid body object. Block 410 may be followed by block 420.

At block 420, a state of the rigid body object is obtained, wherein the state includes a position and a velocity of the rigid body object. The state of the rigid body object is associated with a particular time step and may be an initial (input) state or a state of the rigid body object from a previous time-step. Block 420 may be followed by block 425.

At block 425, a plurality of constraints acting on the rigid body object is determined. The plurality of constraints are determined based on one or more other bodies in the virtual environment that act on the rigid body object. For example, the constraints may include other bodies, e.g., a wall, other objects, as well as other forces, e.g., wind, that are acting on the rigid body object. The constraints can include both holonomic and non-holonomic constraints and are associated with a constraint function.

Some constraint functions characterize connectivity, e.g., structural connectivity between the rigid body and one or more constraints of the plurality of constraints. Some other constraints can be external forces, such as gravity, wind, a hydrostatic force, a force exerted by a motor or other motive component, etc. Constraints can additionally include collisions with other moving and/or stationary rigid body objects. Block 425 may be followed by block 430.

At block 430, a plurality of Jacobians and a plurality of Hessians are determined. Each Jacobian of the plurality of Jacobians is associated with a corresponding constraint of the plurality of constraints and each Hessian of the plurality of Hessians is associated with a corresponding constraint of the plurality of constraints.

A Jacobian (also referred to as a "Jacobian matrix") refers to first-order partial derivatives of a multivariable function. Accordingly, the Jacobian matrix is a mathematical representation that may be used to describe the relationship between the velocities of rigid body objects and their constraints.

The Jacobian matrix may provide information about how changes in the generalized coordinates of rigid body objects in the virtual environment affect the constraints. By multiplying the Jacobian matrix by the vector of generalized velocities, a vector of constraints may be obtained. Accordingly, constraints are determined by the product of the Jacobian matrix and the generalized velocities. The Jacobian matrix may describe how changes in the configuration of the system of rigid body objects affect the constraints. Accordingly, the Jacobian matrix may relate the velocities of rigid body objects in a system to the constraints imposed on those rigid body objects. Accordingly, constraint Jacobians describe the relation between rigid body object velocities and the constraints. Further, the constraint Jacobians describe the effect that a movement of one body will have on another body. Further, the constraint Jacobians describe the transformation between the motion of one rigid body object and another rigid body object via a constraint.

A Hessian (also referred to as a "Hessian matrix") refers to second-order partial derivatives of a multivariable function. In some implementations, determination of the plurality of Jacobians and/or the plurality of Hessians for the rigid body object can include determining an energy potential for each constraint acting on the rigid body object. The energy potential for each constraint determines the force that is imparted on the rigid bodies by the constraint, with the force being the derivative of the potential.

In some implementations, for bilateral, holonomic constraints, a quadratic energy potential can be utilized, e.g., $$U(u) = \frac{1}{2}D(u)^T K D(u),$$

where $$D(u) = hJu$$

$$J = \frac{dC}{dq}G$$

$$u^+ = \underset{u}{\arg\min}\, g(u)$$

C(q) is a holonomic constraint function, K is a constraint stiffness, and in some cases, an additional term $f_{motor}$, a force that a constraint is adding due to a motor may additionally be included.

The first and second derivatives of U(u) and D(u) are obtained from the equations:

$$\frac{dU}{du} = D(u)^T K \frac{dD}{du}$$

$$\frac{d^2 U}{du^2} = \frac{dD^T}{du} K \frac{dD}{du} + D(u)^T K \frac{d^2 D}{du^2}$$

$$\frac{dU}{du} = h\left(\frac{dJ}{du}u + J\right)$$

$$\frac{d^2 U}{du^2} = h\left(\frac{dJ}{du} + \frac{dJ^T}{du} + \frac{d^2 J}{du^2}u\right),$$

where $$\frac{dJ}{du}$$

is a geometric stiffness matrix and $$\frac{d^2 J}{du^2}$$

is a rank 3 tensor.

The force estimate, f, is updated with every iteration of the Newton's method, and is defined as:

$$f = |D(u)^T K|$$

In some implementations, for constraints with force bounds, including contact with friction, a modified energy function $U_b(u)$ can be utilized:

$$U_b(u) = \begin{cases} f_{min}|D(u)| - \gamma_{min} & K|D(u)| < f_{min} \\ f_{max}|D(u)| - \gamma_{max} & K|D(u)| > f_{max} \\ \frac{1}{2}K|D(u)|^2 & \text{otherwise} \end{cases}$$

where $$\gamma_{min} = \frac{f_{min}^2}{2K} \text{ and } \gamma_{max} = \frac{f_{max}^2}{2K}$$

and are selected to ensure $C^0$ continuity when $K|D(u)|=f_{min}(u)$ or when $K|D(u)|=f_{max}(u)$. The potential is quadratic around the origin and is linear past the bounds. The derivatives are determined by the equations:

$$\frac{\partial U_b(u)}{\partial u} = \begin{cases} D(u)^T \left|\frac{f_{min}}{D(u)}\right| \frac{\partial D}{\partial u} & K|D(u)| < f_{min} \\ D(u)^T \left|\frac{f_{max}}{D(u)}\right| \frac{\partial D}{\partial u} & K|D(u)| > f_{max} \\ D(u)^T K \frac{\partial D}{\partial u} & \text{otherwise} \end{cases}$$

$$\frac{\partial^2 U_b(u)}{\partial u^2} = \begin{cases} \frac{\partial D^T}{\partial u}\Lambda_{min}\frac{\partial D}{\partial u} + D(u)^T \Lambda_{min}\frac{\partial^2 D}{\partial u^2} & K|D(u)| < f_{min} \\ \frac{\partial D^T}{\partial u}\Lambda_{max}\frac{\partial D}{\partial u} + D(u)^T \Lambda_{max}\frac{\partial^2 D}{\partial u^2} & K|D(u)| > f_{max} \\ \frac{\partial D^T}{\partial u} K \frac{\partial D}{\partial u} + D(u)^T K \frac{\partial^2 D}{\partial u^2} & \text{otherwise} \end{cases}$$

where $$\Lambda_{min} \equiv \left|\frac{f_{min}}{D(u)}\right|\left(I - \frac{D(u)D(u)^T}{|D(u)|^2}\right)$$

$$\Lambda_{max} \equiv \left|\frac{f_{max}}{D(u)}\right|\left(I - \frac{D(u)D(u)^T}{|D(u)|^2}\right)$$

and.

Similar bounds potentials may be utilized for friction and contact. By setting $f_{min}=0$ and $f_{min}=\infty$, a constant constraint can be defined as:

$$C_n(q) = n^T(a(q) - b(q)) - d,$$

where a(q) and b(q) define world space positions of contact points on respective bodies, A and B, and d is a desired contact distance (collision margin).

In some implementations, determining the energy potential for each constraint can include determining a constraint stiffness (K) of each constraint. The constraint stiffness of each constraint is determined for each timestep.

The choice of a suitable constraint stiffness value, K, for use in the energy potentials is a design parameter to obtain a solution to the set of equations of motion. If K is chosen to be relatively small, then constraints (that should be rigid) will be springy. If K is chosen to be relatively large, then the set of equations becomes poorly conditioned and difficult to solve, in addition to introducing floating point errors that can occur when computationally handling sums of large values and small values. As described herein, an optimal value of K is one that is large enough to provide a rigid-like appearance to the constraints, but not so large that it becomes numerically difficult to solve.

In some implementations, the constraint stiffness, K, is determined based on a function of a force, e.g., a lagged normal force, applied to the constraint from a previous timestep. For example, in contact constraints, $f_n(u)$ from a previous timestep may be utilized when computing friction forces. While this can lead to friction forces being delayed by one timestep, this is a useful approximation that leads to accurate results without noticeable errors.

In some other implementations, when computing friction forces for contact constraints, $f_n(u)$ is evaluated at a current timestep, but simpler derivatives based on a previous timestep are utilized in combination. This may be useful in scenarios where contacts are being quickly created and destroyed, such as a wheel rolling at a rapid rate on the ground. In such implementations, about 50% greater number of Newton iterations may be utilized to obtain convergence of the solution.

In some implementations, the plurality of constraints is compared to prior constraints obtained during an immediately preceding performance of the method, e.g., at a previous timestep to identify an additional constraint. For example, the additional constraint may be a newly introduced constraint, e.g., a constraint that was not present in the previous time step. In such a scenario, where a lagged force, force associated with the constraint at a previous timestep, is not available, the constraint stiffness of the additional constraint can be based on a force acting on the rigid body objects in the additional constraint. For example, in such a scenario, the constraint stiffness of the newly introduced constraint, K, can be based on a force, e.g., gravity, that acts on the bodies in the constraint. In a scenario with two rigid bodies in a constraint, by utilizing a simple approximation, assuming that the constraint stiffness, K is subjected only to the force of gravity can be determined to be:

$$K = \min(M_a, M_b) \times F_{gravity},$$

wherein $M_a$ and $M_b$ are the masses of two rigid body objects in the constraint, and $F_{gravity}$ is the force due to gravity acting on the rigid body objects.

Block 430 may be followed by block 440.

At block 440, a set (system) of equations of motion for the rigid body object is constructed based on the plurality of Jacobians and the plurality of Hessians determined based on the objective function and energy potentials determined for each of the plurality of constraint. The set of equations can be represented as a matrix; each row of the matrix of the system of equations includes the Hessian and the Jacobian of the constraint. Block 440 may be followed by block 450.

At block 450, a first stage of the two-stage primal solver is applied to determine an updated velocity and position for the rigid body object, e.g., velocities and positions associated with the next timestep.

In order to obtain a solution to the set of equations of motion, a two-stage primal solver is applied to the system of equations for the rigid body object. In some implementations, applying the two-stage primal solver can include applying multiple iterations of Newton's method to the set (system) of equations. In some implementations, applying the two-stage primal solver is equivalent to solving a minimization equation determined from the set (system) of equations.

In some implementations, a preconditioned conjugate residual is applied to the set (system) of equations to speed up convergence of the solution. In some implementations, a symmetric positive definite (SPD) preconditioner, e.g., a simple diagonal preconditioner is utilized to enable that the preconditioner is symmetric positive definite. Block 450 may be followed by block 460.

At block 460, a second stage of the two-stage primal solver is applied to the system of equations to determine an updated position for the constraints, e.g., to correct positional errors of the constraints associated with the next timestep, based on the updated velocity. In some implementations, applying the primal solver to determine the updated position can include calculating an integral of (integrating) the updated velocity of the rigid body over a time period, e.g., the time period represented by the difference between a current timestep and a previous timestep.

In some implementations, the first stage of the two-stage primal solver (position correction equations) can utilize different objective functions from the first stage:

$$g(q) = \frac{1}{2}(q - q^-)^T M (q - q^-) + \sum_i U_i(g)$$

$$\frac{dg}{du} = M(q - q^-) + \sum_i \frac{dU_i}{dq}$$

$$\frac{d^2 g}{du^2} = M + \sum_i \frac{d^2 U_i}{dq^2}$$

The corresponding energy potentials can be represented by the equations:

$$U(q) = \frac{1}{2} C(q)^T K C(q)$$

$$\frac{dU}{dq} = C(q)^T K \frac{dC}{dq}$$

$$\frac{d^2 U}{dq^2} = \frac{dC^T}{dq} K \frac{dC}{dq} + C(q)^T K \frac{d^2 C}{dq^2}$$

Splitting the solver into separate position and velocity stages enables handling of positional errors that can occur due to network synchronization, game scripts, or imperfect solutions of the set of equations (e.g., due to residual errors) in previous timesteps.

In some implementations, the second stage of the two-stage primal solver utilizes the same preconditioned linear solver as the velocity stage. Similarly, the constraint stiffness values determined during the first stage of the two-stage primal solver (the velocity stage) are utilized in the second stage of the two-stage primal solver. For example, the constraint stiffness values determined during the first stage of the two-stage primal solver can be retrieved from storage and utilized during the second stage of the two-stage primal solver.

In some implementations, the constraint function C(q) can be multiplied by a constant, e.g., a value between 0, and 1 such that the positional error is corrected smoothly over time rather than all at once.

The two-stage primal solver additionally has the technical advantage that is better suited to handle positional errors, since the position of the constraints is determined independently by the second stage of the primal solver, and is independent of the first stage of the primal solver, which is utilized to solve for the position and velocity of the rigid body object.

In some implementations, the second stage of the two-stage primal solver utilizes multiple iterations of Newton's method, e.g., until a residual error is achieved.

In some other implementations, only one iteration of Newton's method is utilized. For an initial guess of q0=q−, with one Newton step, the right-hand side of the set of equation becomes:

$$\frac{dg}{du} = \sum_i \frac{dU_i}{dq}$$

In some implementations, applying the two-stage primal solver can include applying multiple (e.g., two or more) iterations of Newton's method to the set of equations in the first stage of the two-stage primal solver and applying a single iteration of Newton's method to the set of equations in the second stage of the two-stage primal solver.

Block 460 may be followed by block 470.

At block 470, the rigid body object is displayed in the updated position on a display device. The updated velocity and updated position of the rigid body object can be utilized for animation and determining images (frames) of the virtual environment that depict a state and motion of one or more rigid body objects in the virtual environment.

The lower computational cost can lead to a solver completing its determination of an updated state of a mechanism in a shorter time period using fewer computational resources and can enable smoother animation. The greater stability of the solver, e.g., due to the primal solver being invariant to mass ratios of the rigid body objects in the environment, enables better stability of updated states of the rigid body objects, greater accuracy in simulation and rendering of the rigid body objects, and a better viewing experience for users.

For example, in the illustrative example described in FIG. 3A, the solution error is invariant to the ratio of the masses of first rigid body object 320 and second rigid body object 330.

The constraint functions C(q) depend on position q, which is updated at each Newton step by the equation, $q^+ = q^- + hGu^+$. Therefore, the left-hand side and the right-hand side of the equations are to be completely recomputed when performing each iteration of Newton's method. This can be computationally expensive, and therefore, in some implementations, the constraint functions can be linearized such that C(q) uses $q^-$, the position of the rigid body object at the beginning of a timestep. In practice, this works well since the solver being utilized is a two-stage solver that includes separate position and velocity stages. In single stage solvers, this approximation does not work well, and can lead to poor accuracy.

The left-hand side can also change due to the geometric stiffness term present in dD/du, since it involves a multiplication with u. Therefore, u can also be linearized, using $u^-$, but only when evaluating the left-hand side. For the right-hand side, the non-linearized form is utilized.

Even with the linearization, the left-hand side of the linear system can still change with each iteration of Newton's method. This happens when inequality or bound constraints change from active to inactive or vice versa. This is not common in practice, however. Consequently, the left-hand side of the equation can be reused between Newton iterations, and incrementally updated based on updates to the constraints. For example, terms can be updated by adding or subtracting only those constraint blocks that have changed from a previous iteration.

In some implementations, an additional approximation can be utilized by omitting the rank-3 tensor term present in $d^2D/du^2$. This term is relatively small as it is scaled by $h^3$. In most scenarios, there are no observable differences in convergence when neglecting this term. However, it may be included when highly non-linear constraints are present in the system that could benefit from the inclusion of this term.

Finally, an approximation can be made in the case of bound constraints. Rather than use $\lambda_{min}$ and $\lambda_{max}$ as defined, the approximation: $\lambda_{min} \equiv |f_{min}/D(u)|$ and $\lambda_{max} \equiv |f_{max}/D(u)|$ can be utilized. This simpler form can provide better convergence when utilizing gradient descent methods to solve the set of equations of motion.

In some implementations, during the second stage (position correction stage) of applying the two-stage primal solver, an additional approximation may be made to symmetrize the geometric stiffness term. In some implementations, the $d^2C/dq^2$ term may be replaced with the term $(d^2C/dq^2 + (d^2C/dq^2)^T)/2$. This enables the set of equations to be symmetric, even when some constraints can include non-symmetric geometric stiffness terms, and enables utilization of the conjugate residual, which is applicable to symmetric systems. In practice, this does not have a noticeable effect on the stability properties of the geometric stiffness term. During the first stage of the two-stage primal solver (the velocity stage), the symmetrization happens naturally and there is no need to introduce the approximation in the velocity stage.

Blocks 410-470 can be performed (or repeated) in a different order than described above and/or one or more steps can be omitted. For example, in some implementations, based on an indication that may be received that the model presentation of a rigid body object and the constraints associated with the rigid body object are unchanged from a previous timestep, the constraints and model representation can be assumed to be the same as the previous timestep and only steps 430 to 470 may be performed.

Figure 5:
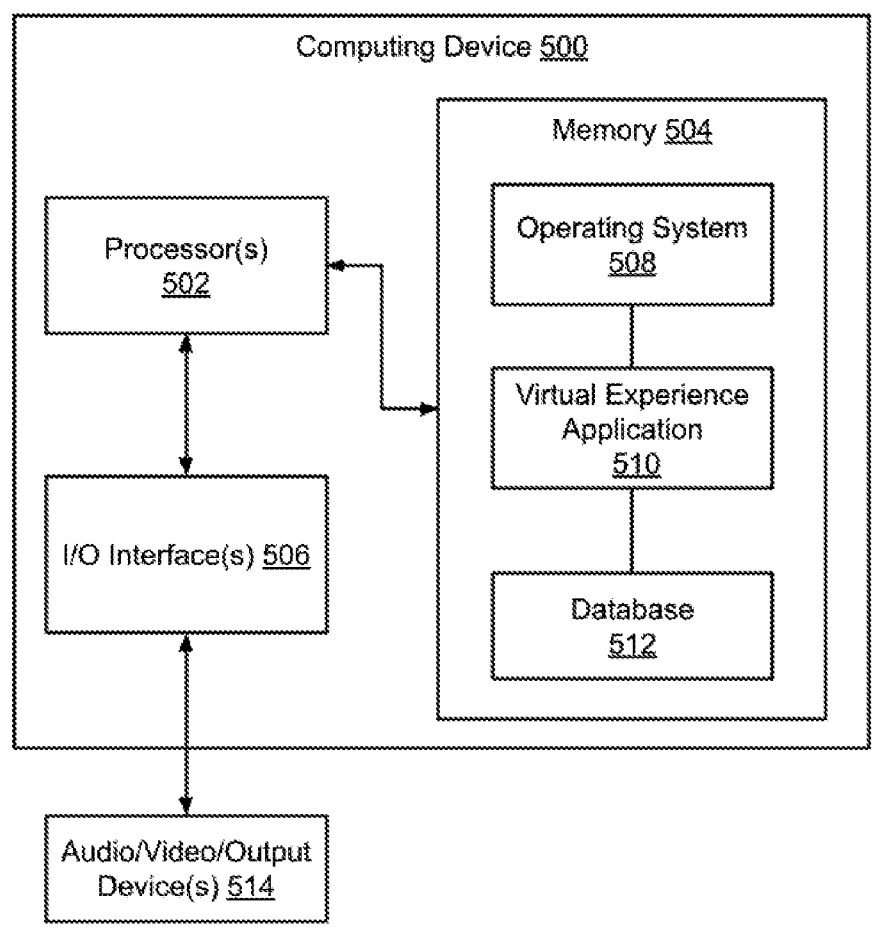
FIG. 5 is a block diagram that illustrates an example computing device, in accordance with some implementations.

FIG. 5 is a block diagram of an example computing device 500 which may be used to implement one or more features described herein. In one example, device 500 may be used to implement a computer device (e.g., 102 and/or 110 of FIG. 1), and perform appropriate method implementations described herein. Computing device 500 can be any suitable computer system, server, or other electronic or hardware device. For example, the computing device 500 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 500 includes a processor 502, a memory 504, input/output (I/O) interface 506, and audio/video input/output devices 514.

Processor 502 can be one or more processors and/or processing circuits to execute program code and control basic operations of the device 500. A processor can include any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, one or more applications 510, e.g., a virtual experience application, and application data 512. In some implementations, application 510 can include instructions that enable processor 502 to perform the functions (or control the functions of) described herein, e.g., some or all of the methods described with respect to FIG. 4.

Elements of software in memory 504 can alternatively be stored on any other suitable storage location or computer-readable medium. In addition, memory 504 (and/or other connected storage device(s)) can store instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. For example, network communication devices, storage devices (e.g., memory and/or data store 120), and input/output devices can communicate via interface 506. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 514 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 5 shows one block for each of processor 502, memory 504, I/O interface 506, and software blocks of operating system 508 and virtual experience application 510. These blocks may represent one or more processors or processing circuitries, operating systems, memories, I/O interfaces, applications, and/or software engines. In other implementations, device 500 may not have all of the components shown and/or may have other elements including other types of elements instead of, or in addition to, those shown herein. While the virtual experience server 102 is described as performing operations as described in some implementations herein, any suitable component or combination of components of virtual experience server 102 or similar system, or any suitable processor or processors associated with such a system, may perform the operations described.

A user device can also implement and/or be used with features described herein. Example user devices can be computer devices including some similar components as the device 500, e.g., processor(s) 502, memory 504, and I/O interface 506. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 514, for example, can be connected to (or included in) the device 500 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

I claim:

1. A computer-implemented method to display a rigid body object in a virtual environment, the method comprising:
obtaining a model representation of the rigid body object;
obtaining a state of the rigid body object, wherein the state includes a position and a velocity of the rigid body object in the virtual environment;
determining a plurality of constraints that act on the rigid body object;
determining a plurality of Jacobians and a plurality of Hessians, wherein each Jacobian of the plurality of Jacobians and each Hessian of the plurality of Hessians is associated with a corresponding constraint of the plurality of constraints;
applying a two-stage primal solver to a set of equations of motion for the rigid body object based on the plurality of Jacobians and the plurality of Hessians, wherein applying the two-stage primal solver comprises:
applying a first stage of the primal solver to determine an updated position and velocity of the rigid body object; and
applying a second stage of the primal solver to determine an updated position of the plurality of constraints; and
displaying the rigid body object in the updated position in the virtual environment.

2. The computer-implemented method of claim 1, wherein the plurality of constraints are determined based on one or more other bodies in the virtual environment that act on the rigid body object.

3. The computer-implemented method of claim 1, wherein applying the two-stage primal solver comprises solving a minimization equation determined from the set of equations.

4. The computer-implemented method of claim 1, wherein the set of equations is represented as a matrix, and wherein each row of the matrix of the set of equations corresponds to a particular constraint of the plurality of constraints.

5. The computer-implemented method of claim 1, wherein applying the first stage to determine the updated position comprises calculating an integral of the updated velocity of the rigid body object over a time period.

6. The computer-implemented method of claim 1, wherein determining the plurality of Jacobians for the rigid body object comprises determining an energy potential for each constraint of the plurality of constraints.

7. The computer-implemented method of claim 6, wherein determining the energy potential comprises determining a constraint stiffness of each constraint of the plurality of constraints.

8. The computer-implemented method of claim 7, wherein determining the constraint stiffness comprises determining the constraint stiffness based on a force applied to the constraint during an immediately preceding performance of the method.

9. The computer-implemented method of claim 7, further comprising comparing the plurality of constraints to prior constraints obtained during an immediately preceding performance of the method to identify an additional constraint, and wherein the constraint stiffness of the additional constraint is based on a force acting on rigid body objects associated with the additional constraint.

10. A non-transitory computer-readable medium with instructions stored thereon that, responsive to execution by a processing device, cause the processing device to perform operations comprising:
obtaining a model representation of a rigid body object;
obtaining a state of the rigid body object, wherein the state includes a position and a velocity of the rigid body object in a virtual environment;
determining a plurality of constraints that act on the rigid body object;
determining a plurality of Jacobians and a plurality of Hessians, wherein each Jacobian of the plurality of Jacobians and each Hessian of the plurality of Hessians is associated with a corresponding constraint of the plurality of constraints;
applying a two-stage primal solver to a set of equations of motion for the rigid body object based on the plurality of Jacobians and the plurality of Hessians, wherein applying the two-stage primal solver comprises:
applying a first stage of the primal solver to determine an updated position and velocity of the rigid body object; and
applying a second stage of the primal solver to correct positional error of the plurality of constraints; and
displaying the rigid body object in the updated position in a virtual environment.

11. The non-transitory computer-readable medium of claim 10, wherein the plurality of constraints are determined based on one or more other bodies in the virtual environment that act on the rigid body object.

12. The non-transitory computer-readable medium of claim 10, wherein determining the plurality of Jacobians for the rigid body object comprises determining an energy potential for each constraint of the plurality of constraints.

13. The non-transitory computer-readable medium of claim 12, wherein determining the energy potential for each constraint comprises determining a constraint stiffness of each constraint of the plurality of constraints.

14. A system comprising:
a memory with instructions stored thereon; and
a processing device, coupled to the memory, the processing device configured to access the memory and execute the instructions, wherein the instructions cause the processing device to perform operations including:
obtaining a model representation of a rigid body object;
obtaining a state of the rigid body object, wherein the state includes a position and a velocity of the rigid body object in a virtual environment;
determining a plurality of constraints that act on the rigid body object;
determining a plurality of Jacobians and a plurality of Hessians, wherein each Jacobian of the plurality of Jacobians and each Hessian of the plurality of Hessians is associated with a corresponding constraint of the plurality of constraints;
applying a two-stage primal solver to a set of equations of motion for the rigid body object based on the plurality of Jacobians and the plurality of Hessians, wherein applying the two-stage primal solver comprises:
applying a first stage of the primal solver to determine an updated position and velocity of the rigid body object; and
applying a second stage of the primal solver to correct positional error of the plurality of constraints that act on the rigid body object; and displaying the rigid body object in the updated position in a virtual environment.

15. The system of claim 14, wherein the plurality of constraints are determined based on one or more other bodies in the virtual environment that act on the rigid body object.

16. The system of claim 14, wherein the set of equations is represented as a matrix, and wherein each row of the matrix of the set of equations corresponds to a particular constraint of the plurality of constraints.

17. The system of claim 14, wherein the operations further comprise determining a constraint stiffness of each constraint of the plurality of constraints.

18. The system of claim 17, wherein determining the constraint stiffness comprises determining the constraint stiffness based on a force applied to the constraint during an immediately preceding performance of the operation.

19. The system of claim 18, wherein the operations further comprise comparing the plurality of constraints to prior constraints obtained during an immediately preceding performance of the operations to identify an additional constraint, and wherein the constraint stiffness of the additional constraint is based on a force acting on rigid body objects associated with the additional constraint.

20. The system of claim 19, wherein the force acting on rigid body objects associated with the additional constraint is gravity.

* * * * *